United States Patent
Pichowicz

[11] 3,824,748
[45] July 23, 1974

[54] PERMA LAND BOUND STAKE DEVICE
[76] Inventor: John R. Pichowicz, Westville Rd., P.O. 51, Plaistow, N.H. 03865
[22] Filed: Feb. 14, 1973
[21] Appl. No.: 331,340

[52] U.S. Cl. .................................. 52/103, 52/162
[51] Int. Cl. ............................................. E04f 9/02
[58] Field of Search ............ 52/103, 160, 161, 162, 52/164

[56] References Cited
UNITED STATES PATENTS

| | | | |
|---|---|---|---|
| 931,420 | 8/1909 | Harris | 52/162 |
| 1,273,890 | 7/1918 | Loseth | 52/162 |
| 2,135,414 | 11/1936 | Shores | 273/106.5 B |
| 2,527,681 | 10/1950 | Lewis | 52/103 |
| 2,667,000 | 1/1954 | O'Connor | 52/103 |
| 2,858,917 | 11/1958 | Wendt | 52/162 |
| 3,012,644 | 12/1961 | Bagh | 52/162 |
| 3,014,305 | 12/1961 | Yarchich | 273/106.5 B |
| 3,507,081 | 4/1970 | Gallup | 52/103 |

FOREIGN PATENTS OR APPLICATIONS

| | | | |
|---|---|---|---|
| 106,239 | 11/1899 | Germany | 248/156 |

*Primary Examiner*—Frank L. Abbott
*Assistant Examiner*—Henry Raduazo
*Attorney, Agent, or Firm*—John C. MacNab

[57] ABSTRACT

This invention relates to a permanent marker stake for use by surveyors. The stake has a top blunt end and a bottom pointed end and carries two blades pivoted to the stake above the pointed end. The free ends of the blades are sharpened and the pivot ends have an abutment to bear against the stake when the blades pivot outwardly. A sleeve having a flange at its upper end is slidably mounted on the stake from a lower position at which the blades are held adjacent the stake to a position above the blades. In the upper position the blades are free to pivot outwardly of the stake. A tension spring is located between each blade and the stake to urge the blades to pivot outwardly when the sleeve has moved to free the blades. Before the stake is driven in the ground the sleeve is in downward position retaining the blades against the stake. At a specific point on the ground the stake is driven into the ground by a hammer or other means. As the stake moves into the ground the flange of the sleeve contacts the ground stopping movement of the sleeve but allowing the stake to further penetrate the ground and the sleeve to release the blades. The blades are then free to pivot and move into the ground to the side of the stake. A short upward movement of the stake causes the sharpened end of the blades to penetrate the ground and move into the ground until the abutments on the blades contact the stake. The stake is then locked into the ground and cannot be removed without digging it out. The upper blunt end of the stake is covered with a cap member. The entire stake has a non-corrosive surface and the upper end of the stake may be covered with a fluorescent material below the cap for more easily locating the stake in the ground.

5 Claims, 4 Drawing Figures

PATENTED JUL 23 1974 3,824,748

PERMA LAND BOUND STAKE DEVICE

This invention relates to a stake device, which is illustrated in the four figures on the accompanying drawing, when driven into the ground to its designed depth it will give a permanent marker for corners of lots or land boundaries. The object of this invention is to have a permanent marker stake that cannot be easily removed, so as to alter the boundary of land without actually digging it out with a shovel. The ease of removing a common driven wooden stake or pipe to alter a boundary line or point through vandalism or the like has created tremendous expense to land owners who have to pay to have the land resurveyed to replace boundary stakes and lot corner stakes. The design of this invention of a stake device has been kept simple to manufacture, in order that the selling price can be kept at a minimum amount, making it available to the average land owner. The device is made of metal or a combination of durable man made materials.

Figure 1:
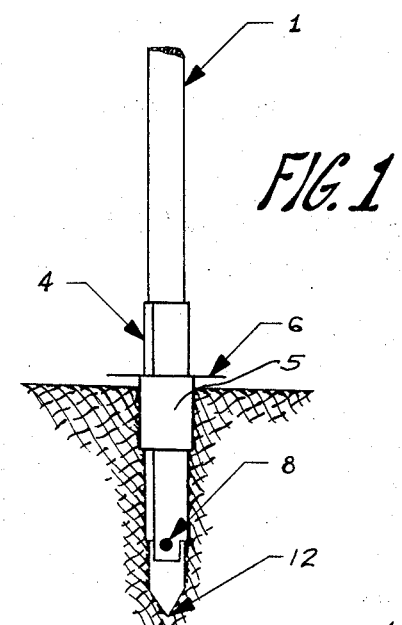
FIG. 1 shows the stake device penetrating the ground, sleeve flange 6 contacting ground surface.
Figure 2:
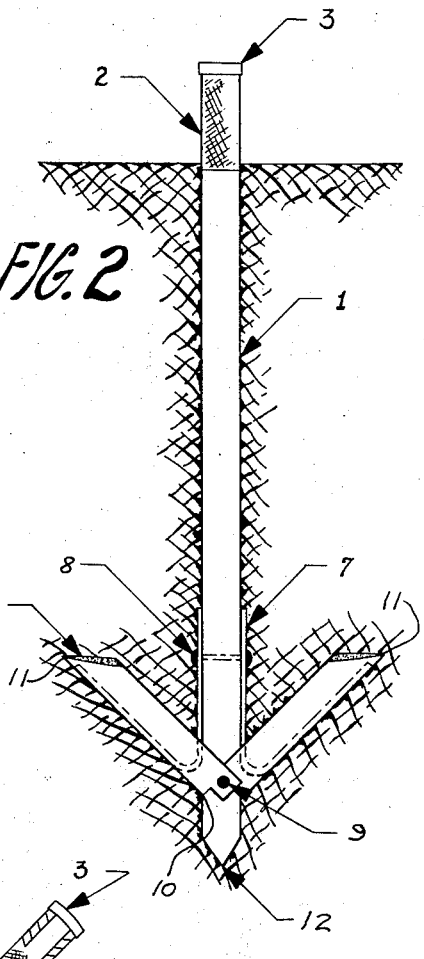
FIG. 2 shows the stake device in place in the ground serving its full purpose of design.

In the drawings:
1. Pipe body
2. Fluorescent Coating
3. Serrated cap
4. Blades
5. Sleeve
6. Sleeve Flange
7. Flat Tension Springs
8. Rivet spring attachment to pipe
9. Rivet for attaching blades pivotally to pipe
10. Abutments on blades
11. Sharp points on blades
12. Pipe point FIG. 2 shows the device after being driven into the ground with the blades 4 expanded after an upward pull has been applied on the pipe body 1 of the stake device. The upward pull upon the pipe body 1 is easily managed, since the blades 4 are compressed around the pipe body 1 as shown in FIG. 1 making the hole in the ground larger than the pipe body 1 as the stake device is driven into the ground. It will be noted in FIG. 1 that a sleeve 5 which holds the two blades 4 together will slip off the blades as the flange 6 of the sleeve 5 comes in contact with the ground as the stake device is being driven into the ground. The purpose of the sleeve flange 6 is to keep the blades 4 together which are being forced out by the flat tension spring 7. As the blades enter the ground the pressure of the surrounding ground will keep them closed until an upward pull is applied locking them open as shown in FIG. 2.

Figure 3:
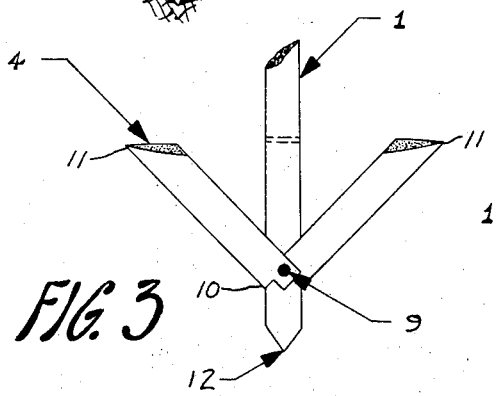
FIG. 3 shows the blade device using no tension springs (7) to expand blades.
Figure 4:
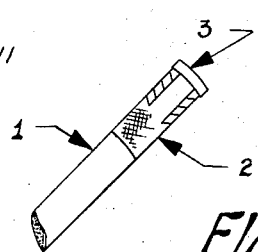
FIG. 4 shows the top of the stake device, fluorescent coating 2 and serrated cap 3 to seal end of pipe body.

In FIG. 3 a modification of the device as shown, wherein no tension springs 7 are used to expand the blades 4. When the stake device is used in ground of light density or marshy ground the blades open freely in the upward pull in this type of application. This feature is important as it helps lower the cost of manufacturing the stake device.

In FIG. 2 it will be noted that the pipe body 1 of the stake device above the ground is fluorescent coated 2 so as to be easily located in leaves or grass. A serrated cap 3 is put in place, after the stake device is driven in the ground thereby keeping rain and deteriorating materials from getting into the pipe body (1) thereby prolonging the life of the stake device.

It will be noted that the pipe body 1 is pointed 12 for easy penetration of the ground.

The entire stake device which is to set below the ground is to have a protective coating 2 applied to prolong the life of the stake device.

In the accompanying drawing I have illustrated one embodiment of my invention, but I wish it to be understood that various changes may be made within the spirit of my invention. Without departing from the scope of my claims, I therefore desire that the form shown in the drawings be considered in an illustrative rather than in a limited sense.

I claim:

1. A surveyor's stake of durable man made material comprising a rigid stiff elongated rod having a blunt top end and a pointed bottom end; blades, each having a sharpened end and an abutment end; pivot means above the pointed end of the rod and extending through the abutment ends of the blades to permit the blades to freely pivot outwardly from the rod; tension spring elements; means fixedly attaching one end of each tension spring element to the rod above the pivot means, the other end of each tension spring element resting upon the side of each blade facing the rod to urge the sharpened ends of the blades away from the rod; sleeve means slidably mounted on said rod above the pointed ends of the blades and adapted to slide over the sharpened ends of the blades to retain the blades against the rod with the springs between the blades and the rod with the springs under tension; a ground engaging flange element fixed to the upper end of said sleeve; whereby when the rod is driven into the ground by means not shown, the pointed end of the rod moves into the ground until the blades are substantially beneath the surface of the ground and, upon further penetration of the rod, the flange of the sleeve contacts the surface of the ground, the sleeve moves up releasing the blades and allowing the sharpened ends of the blades to move outwardly from the rod under the action of the springs and upon raising the rod slightly the blades pivot outwardly until the blade abutments engage the rod and the blades are in locking position in the ground with the top end of the rod above the ground.

2. The structure recited in claim 1 above wherein the rod is an iron pipe; a ground penetrating point on the bottom end of the pipe and the blades are concave transversely to nest against the pipe with the springs between the blades and the pipe.

3. The structure of claim 2 wherein the pipe is coated with a non-corrosive surface and there is a metalic cap on the top end of the pipe and there is a fluorescent coating on the pipe below the cap.

4. A surveyor's stake comprising a straight pipe having a blunt top end and pointed bottom end; two transversely concaved blades, each having a sharp end and an abutment end; pivot means adjacent the abutment ends of the blades, said pivot means extending through the blades and pipe above the pointed end of the pipe to permit the blades to pivot freely outwardly from said pipe; a sleeve slidably mounted on said pipe adapted to slide over the sharp ends of the blades to retain said blades against said pipe; a ground engagement flange mounted on the upper end of said sleeve; whereby when the pipe is driven into the ground by means not shown, the pointed end of the pipe enters the ground and the pipe moves into the ground until the blades are well beneath the surface of the ground and further downward movement of the pipe causes the flange on the sleeve to move out of the contact with the blades allowing the blade to move outwardly into the ground upon a short upward movement of the pipe.

5. The structure of claim 4 wherein the pipe has a non-corrosive surface; a hard metallic cap is mounted over the blunt end of the pipe and a fluorescent band of material envelopes the pipe below said cap.

* * * * *